United States Patent [19]

Reiser

[11] Patent Number: 5,084,363
[45] Date of Patent: Jan. 28, 1992

[54] MOLTEN CARBONATE FUEL CELL POWER PLANT

[75] Inventor: Carl A. Reiser, Glastonbury, Conn.

[73] Assignee: International Fuel Cells Corp., South Windsor, Conn.

[21] Appl. No.: 463,170

[22] Filed: Jan. 10, 1990

[51] Int. Cl.$^5$ .............................................. H01M 8/06
[52] U.S. Cl. ................................ 429/19; 429/16; 429/26
[58] Field of Search .................. 429/16, 17, 19, 26

[56] References Cited

U.S. PATENT DOCUMENTS

| | | |
|---|---|---|
| 3,146,131 | 8/1964 | Linden . |
| 3,485,676 | 12/1969 | Hodgson . |
| 3,718,506 | 2/1973 | Fischer et al. . |
| 4,041,210 | 8/1977 | Van Dine .................. 429/19 X |
| 4,647,516 | 3/1987 | Matsumura et al. ............. 429/16 X |
| 4,650,728 | 3/1987 | Matsumura et al. .................. 429/19 |
| 4,714,681 | 12/1987 | Kaun et al. ....................... 429/16 X |
| 4,766,044 | 8/1988 | Sederquist ............................ 429/19 |
| 4,865,926 | 9/1989 | Levy et al. ....................... 429/17 X |

FOREIGN PATENT DOCUMENTS

| | | |
|---|---|---|
| 89-109529 | 9/1990 | European Pat. Off. . |
| 61-237370 | 3/1987 | Japan . |
| 62-283570 | 5/1988 | Japan . |

Primary Examiner—Stephen J. Kalafut

[57] ABSTRACT

A molten carbonate fuel cell power plant is disclosed. The power plant of the present invention includes an insulated enclosure and a fuel cell stack, a sensible heat reformer, fuel stream and air stream recycle loops and a catalytic burner, each within the enclosure. The molten carbonate fuel cell power plant of the present invention is compact, easily transportable and provides cost and efficiency improvements over conventional molten carbonate fuel cell power plants.

9 Claims, 2 Drawing Sheets

MOLTEN CARBONATE FUEL CELL POWER PLANT

TECHNICAL FIELD

The present invention relates to the art of fuel cell power plants, and more particularly to the art of molten carbonate fuel cell power plants.

BACKGROUND OF THE INVENTION

A fuel cell power plant is a device for directly converting the chemical energy of the fuel into electrical power energy. A molten carbonate fuel cell comprises an anode, a cathode, and a carbonate electrolyte contained within a porous matrix between the anode and cathode. In the operation of a typical molten carbonate fuel cell, a hydrogen containing gas fuel stream is fed to the anode and an oxygen containing oxidant gas stream is fed to the cathode. On the anode side of the cell, hydrogen is electrochemically oxidized to give up electrons, according to the reaction:

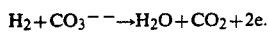

$$H_2 + CO_3^{--} \rightarrow H_2O + CO_2 + 2e.$$

The electrical current so generated is conducted from the anode through an external circuit to the cathode. The $CO_2$ produced at the anode is transferred to the cathode. On the cathode side of the cell, the electrons are electrochemically combined with the oxidant, according to the reaction:

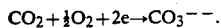

$$CO_2 + \tfrac{1}{2}O_2 + 2e \rightarrow CO_3^{--}.$$

The flow of ions through the electrolyte completes the circuit. Molten carbonate fuel cells are typically operated at temperature of about 650° C. under pressures of up to about 10 atm.

In a conventional molten carbonate fuel cell power plant design, the $CO_2$ produced at the anode is transferred to the cathode by recycling a portion of the anode exhaust. Typically, a portion of the cathode exhaust is also recycled and a mixture of air, anode exhaust and cathode exhaust is mixed and combusted in a catalytic burner to provide a $CO_2$-rich oxidant stream to the cathode. The temperatures of the influent fuel and oxidant streams are below the operating temperature of the fuel cell and the fuel cell is cooled by the introduction of the lower temperature reactant streams. Typically, the fuel stream comprises a hydrogen containing gas by reforming a light hydrocarbon in a sensible heat reformer.

The conventional approach to designing a molten carbonate fuel cell power plant involves a large number, e.g. up to about 50, of fuel cell stacks which share a common reformer, a common pair of recycle loops and a common catalytic burner. Connecting the large number of fuel cell stacks with the shared power plant elements provides a cost effective design with regard to the costs of the individual elements of the power plant, but incurs very high installation costs due to the lengthy piping runs required to interconnect the elements of the power plant and the large number of plumbing connections that must be made in the field. The conventional approach also results in inefficiencies in the operation of the fuel cell power plant due to the relatively large heat losses and pressure drops suffered along the lengthy piping runs.

There is a constant search in the art for ways to reduce the cost of molten carbonate fuel cell power plants.

SUMMARY OF THE INVENTION

A molten carbonate fuel cell power plant is disclosed. The power plant comprises an enclosure, a molten carbonate fuel cell means disposed within the enclosure, means for providing a hydrocarbon fuel stream to the enclosure, reformer means disposed within the enclosure for converting the hydrocarbon fuel stream to a hydrogen fuel stream, means for providing the hydrogen fuel stream to the fuel cell means, means for directing anode exhaust from the fuel cell means, and recycle means for combining a portion of anode exhaust with the fuel stream are provided. Means for providing an oxidant stream to the fuel cell means, cathode exhaust means for directing cathode exhaust from the fuel cell means, and cathode exhaust recycle means for combining a portion of the cathode exhaust stream with the oxidant stream to form a diluted oxidant stream are also provided.

The power plant of the present invention provides a low cost system in that the cross section area and the length of the piping required to interconnect the elements of the power plant are minimized. The power plant of the present invention provides improved efficiency due to reduced heat losses and reduced pressure drops associated with the reduction in the length of the piping runs. The power plant of the present invention provides lower field construction costs, since the power plant may be factory assembled and shipped to the construction site as a prefabricated unit.

In the preferred embodiment, the power plant includes means for combining a portion of anode exhaust stream with the diluted oxidant stream to form a mixture of anode exhaust and diluted oxidant, means for combusting the mixture of anode exhaust and diluted oxidant to provide a carbon dioxide rich oxidant stream.

DETAILED DESCRIPTION OF THE DRAWINGS

Figure 1:
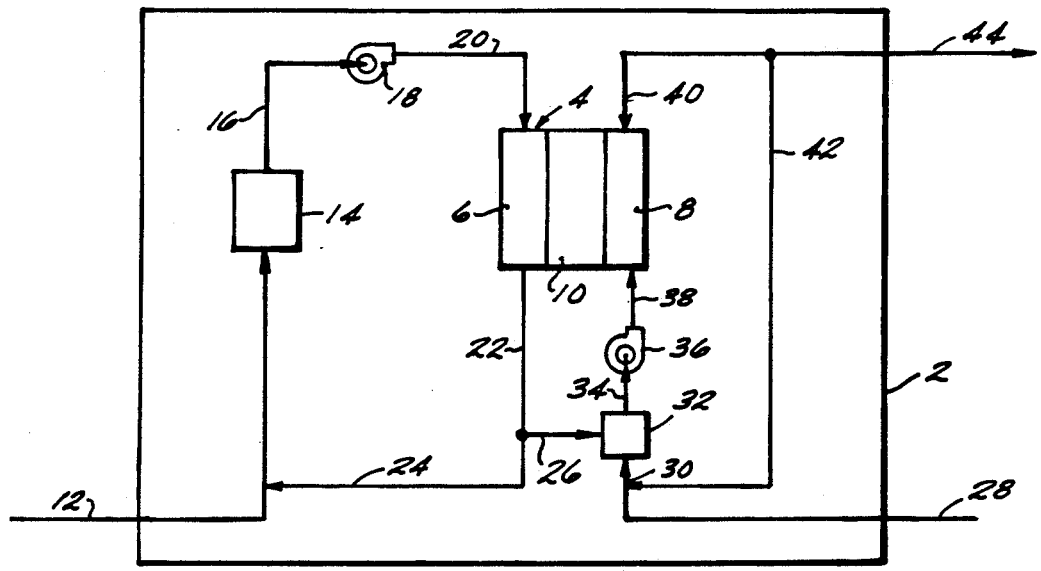
FIG. 1 shows a schematic diagram of the molten carbonate fuel cell power plant of the present invention.

Referring to FIG. 1, the molten carbonate fuel cell power plant of the present invention includes an enclosure 2 and a molten carbonate fuel cell 4 within the enclosure. The molten carbonate fuel cell 4 includes an anode 6, a cathode 8, and a carbonate electrolyte 10 between the anode 6 and cathode 8. A hydrocarbon fuel stream 12 is provided to the enclosure. The hydrocarbon fuel stream 12 is converted to a hydrogen fuel stream 16 in reformer 14. The reformer 14 is disposed within enclosure 2 to take advantage of the heat generated by the fuel cell in driving the endothermic reforming reaction. The hydrogen fuel stream 16 is compressed in fuel stream blower 18 to provide a pressurized hydrogen fuel stream 20 to the anode 6. Alternatively, the fuel stream blower 18 may be disposed downstream of fuel cell 4.

An anode exhaust stream 22 is directed away from the anode 6. The anode exhaust stream 22 is split into a first anode exhaust recycle stream 24 that is combined with the hydrocarbon fuel stream 12 and a second anode exhaust recycle stream 26 that is provided to catalytic burner 32.

Air stream 28 is provided to the enclosure and is combined with cathode exhaust recycle stream 42 to form a diluted oxidant stream 30. Diluted oxidant stream 30 is provided to the catalytic burner 32. The second anode exhaust recycle stream 26 and the diluted oxidant stream 30 are mixed and combusted in the catalytic burner 32 to produce a $CO_2$ rich oxidant stream 34. The $CO_2$ rich oxidant stream 34 is compressed in oxidant stream blower 36 to provide a pressurized $CO_2$ rich oxidant stream 38 to the cathode 8. Alternatively, the oxidant stream blower 36 may be disposed downstream of the fuel cell 4. A cathode exhaust stream 40 directs reaction products away from the cathode 8. The cathode exhaust stream 40 is split into two streams, cathode exhaust recycle stream 42 and power plant exhaust stream 44.

Figure 2:
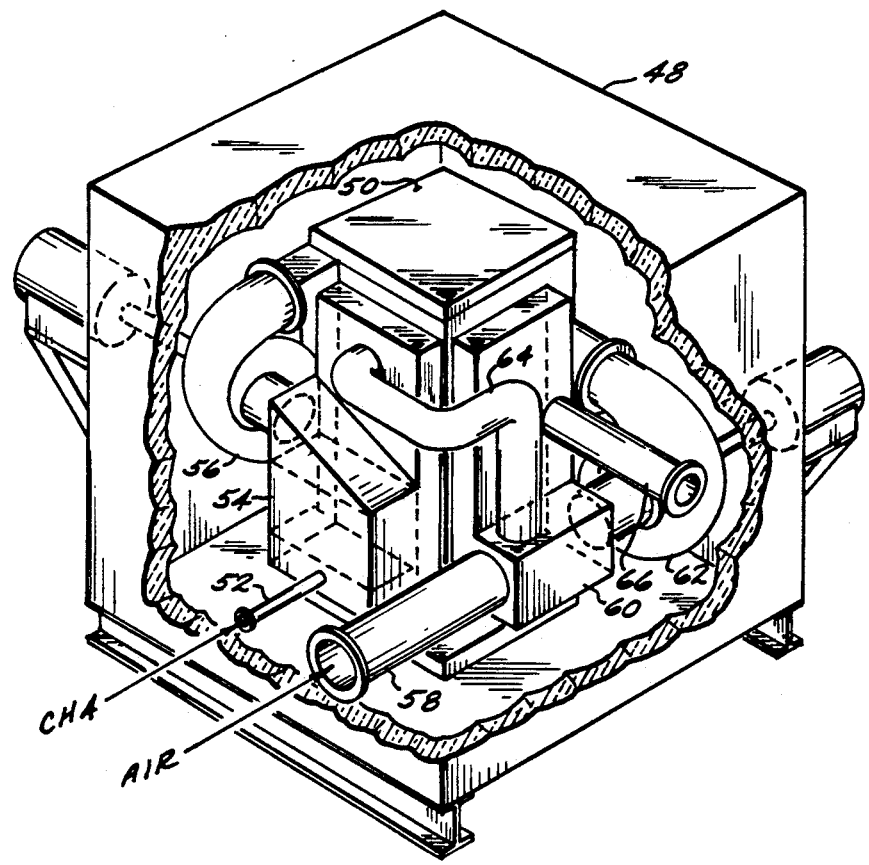
FIG. 2 shows a partially cut-away perspective view of one embodiment of molten carbonate fuel cell power plant of the present invention.

FIG. 2 shows a partially broken away perspective view of one embodiment of the molten carbonate fuel cell power plant of the present invention. The embodiment includes a thermally insulated enclosure 48. A molten carbonate fuel cell stack 50 is disposed within the enclosure. A hydrocarbon fuel stream is provided through conduit 52 to sensible heat reformer 54. The hydrocarbon fuel stream is converted to a hydrogen fuel stream in sensible heat reformer 54. The hydrogen fuel stream is compressed in fuel stream blower 56 and provided to the anode sides of the fuel cells in the fuel cell stack 50. An anode exhaust stream 64 exits fuel cell stack 50 and is provided to catalytic burner 60.

An air stream is provided through conduit 58 to the catalytic burner 60. The anode exhaust and air stream are mixed in the catalytic burner 60 and combusted to provide a $CO_2$ rich oxidant stream. The oxygen depleted oxidant stream is compressed and provided to the cathode sides of the fuel cells in fuel cell stack 50 by oxidant stream blower 62. Cathode exhaust is directed away from the fuel cell stack 50 and out of the enclosure 48 through conduit 66.

Figure 3:
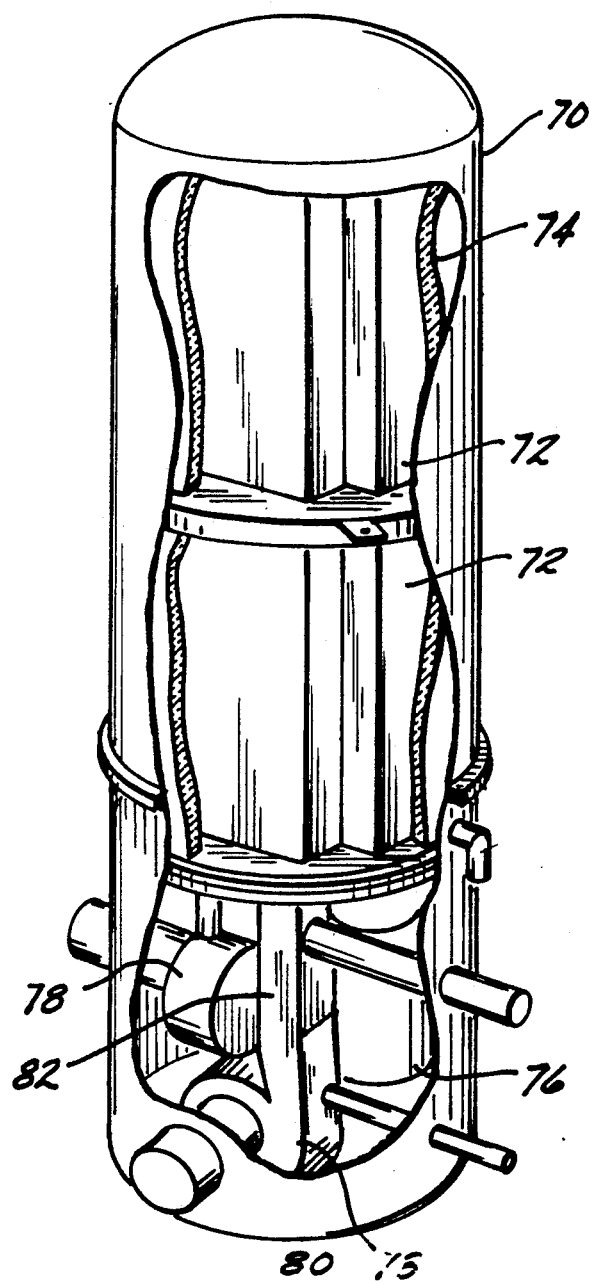
FIG. 3 shows a partially cut-away perspective view of a second embodiment of the molten carbonate fuel cell power plant of the present invention.

FIG. 3 shows a partially broken away perspective view of a second preferred embodiment of the molten carbonate fuel cell power plant of the present invention. The embodiment includes a pressure vessel 70, stacked fuel cells 72 within the pressure vessel 70 and a layer of thermal insulation 74 between the fuel cells 72 and the pressure vessel 70. A sensible heat reformer 76 for reforming a hydrocarbon fuel stream, an anode recycle blower 78, a cathode recycle blower 80 and a catalytic burner 82 for combusting a mixture of air, anode exhuast and cathode exhaust are also included within the pressure vessel 70. An air inlet 82, fuel inlet (not shown), exhaust outlet (not shown) and power takeoff 84 are also provided.

The power plant of the present invention provides a low cost system in that cross sectional areas and the lengths of the required piping runs are minimized. The power plant of the Present invention provides improved efficiency due to reduced heat losses and pressure drops associated with the reduction in the cross sectional areas and lengths of the recycle piping runs. The power plant of the present invention provides lower field construction costs, since the power plant may be factory assembled and shipped to the construction site as a prefabricated unit.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A molten carbonate fuel cell power plant, comprising:
   a thermally insulating enclosure:
   molten carbonate fuel cell means, disposed within the enclosure, for electrochemically reacting a fuel stream and an oxidant stream to generate an electrical current, heat, an anode exhaust stream and a cathode exhaust stream;
   reformer means for endothermically converting a hydrocarbon fuel stream to a hydrogen fuel stream, said reformer means being separate from said fuel cell means and disposed within said enclosure so that heat generated by the fuel cell means is transferred to said reformer means to drive conversion of the hydrocarbon fuel stream;
   means for directing the hydrocarbon fuel stream to the reformer means;
   means for directing the hydrogen fuel stream from the reformer means to the fuel cell means;
   means for directing an oxidant stream to the fuel cell means;
   anode exhaust means for directing the anode exhaust stream from the fuel cell means;
   first anode exhaust recycle means for combining a portion of the anode exhaust stream with the hydrocarbon fuel stream;
   cathode exhaust means for directing the cathode exhaust stream from the fuel cell means;
   cathode exhaust recycle means for combining a portion of the cathode exhaust stream with the oxidant stream to form a diluted oxidant stream;
   second anode exhaust recycle means for combining a portion of the anode exhaust stream with the diluted oxidant stream to form a mixture of anode exhaust and diluted oxidant; and
   means for combusting the mixture of anode exhaust and diluted oxidant to provide a $CO_2$ rich oxidant stream;
   wherein said first and second anode exhaust recycle means, said cathode exhaust recycle means and said means for combusting are each disposed within the enclosure to minimize heat losses from the power plant and minimize pumping losses within the power plant, said power plant providing improved efficiency of operation.

2. The power plant of claim 1, wherein the fuel cell means comprises a fuel cell stack and an inner enclosure surrounding the fuel cell stack and wherein the reformer means is disposed outside of said inner enclosure.

3. The powerplant of claim 1, wherein the enclosure comprises a pressure vessel.

4. The powerplant of claim 3, further comprising: a thermally insulative enclosure disposed within the pressure vessel and surrounding the fuel cell means.

5. The powerplant of claim 1, wherein the means for providing the hydrogen fuel stream further comprises first blower means for urging the hydrogen fuel stream to the fuel cell means and the means for providing an oxidant stream to the fuel cell comprises second blower means for urging the oxidant stream to the fuel cell means.

6. The powerplant of claim 1, wherein the anode exhaust means further comprises first blower means for urging the anode exhaust stream from the fuel cell means and the cathode exhaust means further comprises second blower means for urging the cathode exhaust stream from the fuel cell means.

7. The powerplant of claim 1, wherein the fuel cell means comprises a plurality of fuel cells.

8. The powerplant of claim 7, wherein each fuel cell comprises an anode, a cathode and a carbonate electrolyte between the anode and the cathode.

9. The powerplant of claim 1, further comprising: means for conducting the electrical current from the enclosure.

* * * * *